United States Patent
Zitnick, III et al.

(10) Patent No.: US 9,275,680 B2
(45) Date of Patent: Mar. 1, 2016

(54) VIEWER-CENTRIC USER INTERFACE FOR STEREOSCOPIC CINEMA

(75) Inventors: Charles Lawrence Zitnick, III, Seatle, WA (US); Bryan K. Ressler, Sammamish, WA (US); Sing Bing Kang, Redmond, WA (US); Michael F. Cohen, Seattle, WA (US); Jagannatha Koppal, Pittsburgh, PA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1101 days.

(21) Appl. No.: 12/485,179

(22) Filed: Jun. 16, 2009

(65) Prior Publication Data

US 2010/0318914 A1 Dec. 16, 2010

(51) Int. Cl.
| | |
|---|---|
| *G06F 3/048* | (2013.01) |
| *G11B 27/034* | (2006.01) |
| *G11B 27/34* | (2006.01) |
| *H04N 21/485* | (2011.01) |
| *H04N 21/6377* | (2011.01) |
| *H04N 21/658* | (2011.01) |

(52) U.S. Cl.
CPC ............... *G11B 27/034* (2013.01); *G11B 27/34* (2013.01); *H04N 21/4854* (2013.01); *H04N 21/6377* (2013.01); *H04N 21/658* (2013.01)

(58) Field of Classification Search
USPC .......................................................... 715/719
See application file for complete search history.

(56) References Cited

U.S. PATENT DOCUMENTS

| | | |
|---|---|---|
| 2003/0038875 A1 | 2/2003 | Ivanov et al. |
| 2003/0113018 A1 | 6/2003 | Nefian et al. |
| 2004/0022320 A1 | 2/2004 | Kawada et al. |
| 2006/0013438 A1 | 1/2006 | Kubota |
| 2009/0244269 A1* | 10/2009 | Watanabe et al. ............... 348/51 |

FOREIGN PATENT DOCUMENTS

| | | | |
|---|---|---|---|
| JP | 2002-101428 | A | 4/2002 |
| JP | 2003-236698 | A | 8/2003 |
| JP | 2003-348384 | A | 12/2003 |
| JP | 2009-118026 | A | 5/2009 |
| WO | 9615631 | A1 | 5/1996 |
| WO | 02073980 | A1 | 9/2002 |
| WO | 2009015007 | A1 | 1/2009 |

OTHER PUBLICATIONS

Kelly L. Murdock, "3ds Max 2009 Bible," John Wiley & Sons, Aug. 11, 2008, pp. 39-41, 79-83, 133-143, 191-203, 463-478, and 571-580.*

(Continued)

*Primary Examiner* — William Trapanese
(74) *Attorney, Agent, or Firm* — Alin Corie; Sandy Swain; Micky Minhas

(57) ABSTRACT

Described is a user interface that displays a representation of a stereo scene, and includes interactive mechanisms for changing parameter values that determine the perceived appearance of that scene. The scene is modeled as if viewed from above, including a representation of a viewer's eyes, a representation of a viewing screen, and an indication simulating what each of the viewer eyes perceives on the viewing screen. Variable parameters may include a vergence parameter, a dolly parameter, a field-of-view parameter, an interocular parameter and a proscenium arch parameter.

20 Claims, 7 Drawing Sheets

(56) References Cited

OTHER PUBLICATIONS weirdox.org, "stereoscopy with 3D-Studio MAX," http://iglasses,weirdoz.org/stereo/3dsmax/, Jul. 26, 2001.*

3dphoto.net, "The Importance of the Stereo Window," Sep. 2006, 7 pages.*

"International Search Report", Mailed Date: Jan. 14, 2011, Application No. PCT/US2010/038913, Filed Date: Jun. 16, 2010, pp. 9.

"Office Action Received for European Patent Application No. 10790164.7", Mailed Dated: Aug. 14, 2014, 9 Pages.

"First Office Action Received in China Patent Application No. 201080027478.3", Mailed Dated : Sep. 3, 2013, 11 Pages.

"Second Office Action Received in China Patent Application No. 201080027478.3", Mailed Dated: Apr. 28, 2014, 15 Pages.

Singh, et al., "The Bar: A Perspective-based Camera Widget", In Proceedings of the 17th annual ACM symposium on User interface software and technology, Oct. 24, 2004, 4 Pages.

"Creating a Great, Simple Stereo Camera for 3D CGI", Published on: Nov. 4, 2005, Available at: http://www.stereo3d.com/discus/messages/21/3032.html?1131084073.

"Notice of Allowance issued in Japan Patent Application No. 2012-516281", Mailed Date: Mar. 17, 2015, 3 Pages. (w/o English Translation).

"Third Office Action Received for Chinese Patent Application No. 201080027478.3", Mailed Date: Nov. 15, 2014, 9 Pages.

"Office Action Issued in Chinese Patent Application No. 201080027478.3", Mailed Date: Apr. 3, 2015, 8 Pages.

* cited by examiner

VIEWER-CENTRIC USER INTERFACE FOR STEREOSCOPIC CINEMA

BACKGROUND

Stereo movies, also referred to as 3D movies, are once again relatively popular, providing viewers with viewing experiences that are unavailable with conventional movies. The viewing experiences that a viewer gets with a stereo movie result from a combination of factors, including camera parameters, viewing location, projector screen configuration, and other (e.g., psychological) factors. Depending on these factors, the viewing experience for a given viewer can range from pleasant to distracting or even uncomfortable, (e.g., from eye strain induced by certain stereoscopic effects).

Stereo film-makers and photographers have learned various heuristics for avoiding or deliberately enhancing well-known stereoscopic effects, such as "cardboarding," "pinching," "gigantism" and "miniaturization" effects. However, until a scene is shot, the director is not really able to visualize how the scene will appear to the viewer. Thus, obtaining desired results and/or effects with respect to shooting a 3D scene typically requires a substantial amount of planning, re-shooting, re-planning, re-shooting, and so on.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which a user interface displays a representation of a stereo scene, and includes interactive mechanisms for changing parameter values that determine the perceived appearance of that scene. In one implementation, the interactive mechanisms comprise dots/handles that are interactively moveable relative to the scene, wherein their positions correspond to the values of the parameters.

In one aspect, the scene is modeled as if viewed from above, including a representation of a viewer's eyes, a representation of a viewing screen, and an indication simulating what the viewer perceives on the viewing screen. The interactive mechanisms may be positioned within this "above view" of the scene.

A user may use the user interface to plan a scene, e.g., by starting with a test scene and by manipulating the parameter values to determine the effect of varying them. Once decided, the parameter values may then be applied to a stereo camera to shoot the actual scene.

A user may use the user interface to edit an existing scene. The parameter values may be interactively changed, and the resulting video scene with the revised parameters previewed to determine the effect of the parameter changes.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards a user interface for editing and/or planning stereo (3D) movies. In one aspect, the user interface allows the editor to adjust a set of parameters that affect the movie viewing experience. At the same time, the user interface is viewer-centric, in that the interface models the perceived 3D experience as seen from the movie viewer's perspective. More particularly, the user interface shows a perceived world from above, that is from an "above" viewing perspective, which allows the movie editor/planner to see the perceived 3D depth of objects in the movie relative to the movie viewer and a viewing screen.

It should be understood that any of the examples herein are non-limiting. As such, the present invention is not limited to any particular embodiments, aspects, concepts, structures, functionalities or examples described herein. Rather, any of the embodiments, aspects, concepts, examples, structures, or functionalities described herein are non-limiting, and the present invention may be used various ways that provide benefits and advantages in computing and video technology in general.

Figure 1:
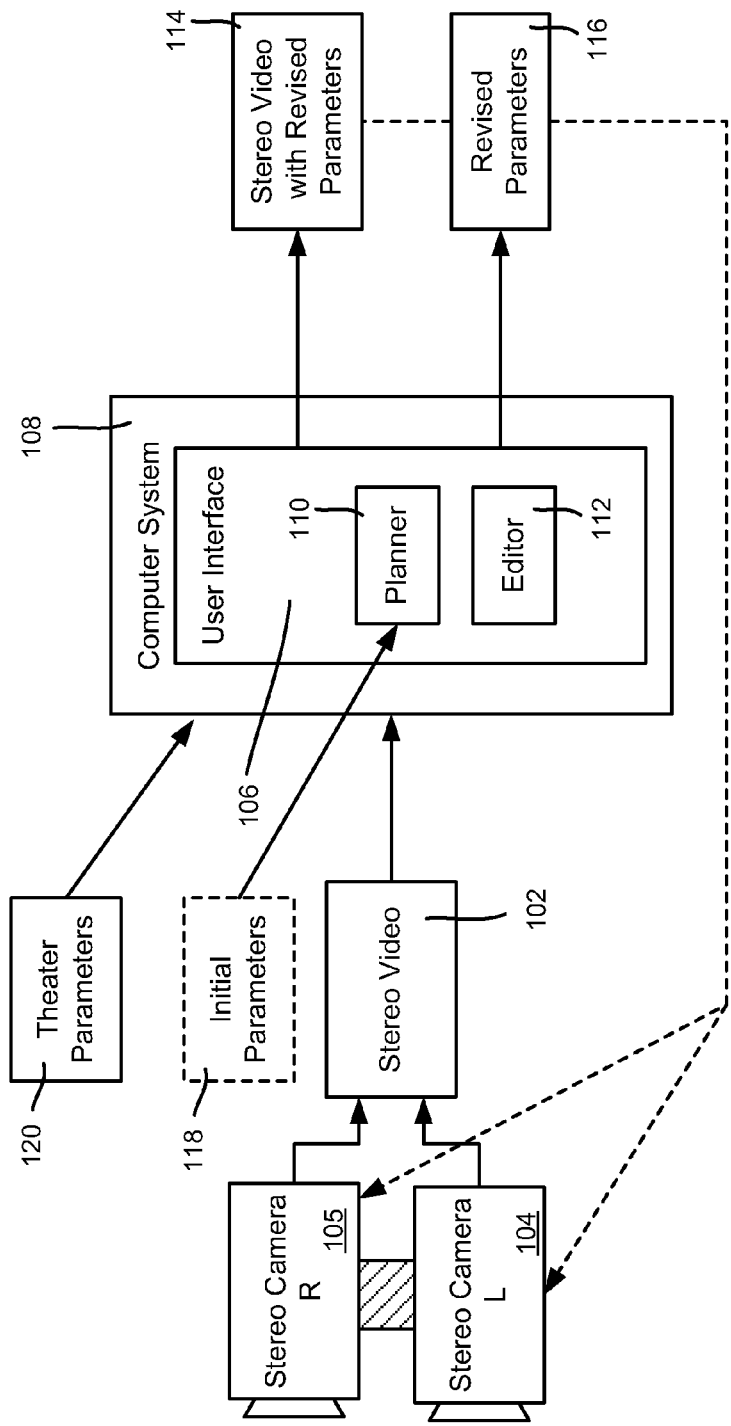
FIG. 1 is a block diagram representing example components for implementing a viewer-centric user interface for editing and/or planning stereoscopic cinema scenes.

FIG. 1 shows a block diagram that includes components for capturing and interacting with stereo video 102, e.g., a set of one or more video scenes. Left and right stereo video cameras 104 and 105 shoot the scene. A user interface 106 running on a computer system 108 allows for planning and/or editing of parameters associated with the stereo video 102 via planner and/or an editor 110, 112, respectively. The user interface thus facilitates shot planning and after-the-fact digital manipulation of the perceived scene. Note that shot planning and after-the-fact digital manipulation techniques are not limited to video but apply to stereo film recordings as well; e.g., contemporary film cameras have "video assist" feeds that can be used to feed the presented system, and the output parameters can be applied to the film cameras (which thereby applies them to the video assist outputs from the cameras, allowing the feedback loop with the software to continue).

The parameters include vergence or horizontal image shift (corresponding to how much the cameras are turned relative to one another), interocular (the distance between the cameras), dolly (how far away the cameras are from a target), field of view of the cameras (self-explanatory) and proscenium arch (related to compensating for situations in which one eye of a viewer can see something that is not visible due to being off screen to the other eye). Manipulation of each of these parameters via the user interface 106 is described below.

The result of the planning and/or editing is revised video 114 along with the revised parameters 116. When editing, the revised video 114 is kept if the results are as desired. When planning, the revised parameters 116 are used to re-shoot the corresponding scene, (e.g., with reconfigured camera calibration parameters determined during the planning).

Note that planning requires knowledge of initial camera parameters, as represented in FIG. 1 via the block 118. However, as can be readily appreciated from the mathematical framework described below, editing does not require absolute values of these parameters, as relative adjustments to the parameters may be made.

Another type of data that may be input corresponds to theater parameters 120, e.g., changing the size/position of the screen relative to the viewer. If the theater parameters 120 are changed, the other parameters may be automatically adjusted to provide new viewing parameters.

With respect to planning, shooting a 3D film is difficult because it is challenging to imagine how the audience's experience will differ from the director's vision. The user interface 106 addresses this problem by providing a way to plan for the shot, given rough takes of the scene and/or still images. By adjusting parameters, via a point cloud in a top-down view of the interface (as described below with reference to FIG. 4), the desired camera parameters can be output, e.g., as ratios of the parameters used to generate the rough takes.

Figure 2:
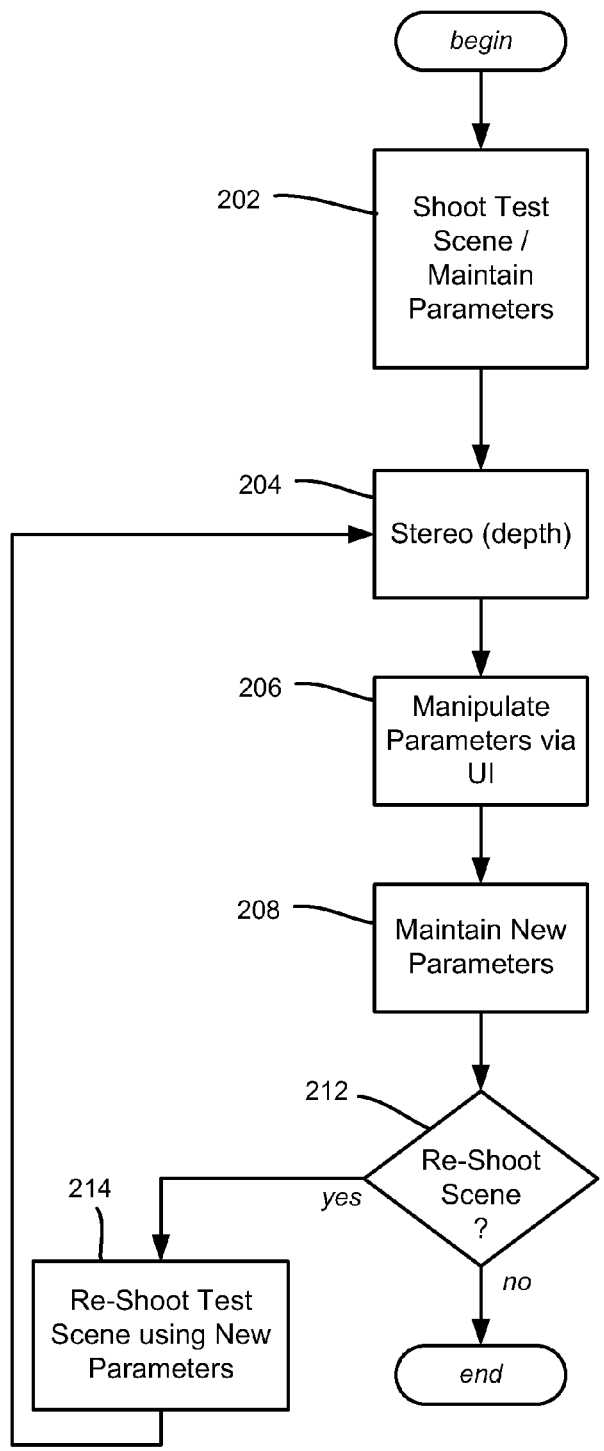
FIG. 2 is a flow diagram representing example steps to plan a stereoscopic cinema scene including interacting with parameters via the user interface.

FIG. 2 shows steps of a typical planning operation. Step 202 represents shooting a test scene, with camera calibration parameters maintained that are a subset of the parameters described above, including camera interocular, camera field-of-view/focal length, and vergence angle. The planner chooses a stereo depth (step 204), and manipulates the parameter values (step 206) via the user interface as described below. (Note that stereo depth is precomputed using a separate process, e.g., using the technique described in the paper "High-quality video view interpolation using a layered representation" by C. L. Zitnick, S. B. Kang, M. Uyttendaele, S. Winder, and R. Szeliski, SIGGRAPH 2004.) These parameter values are maintained in an appropriate way (step 208) and used to calibrate the camera to re-shoot the test scene (step 214), until the parameter values provide the desired scene, whereby the scene (or another test scene) need not be re-shot (step 212). Depending on what is being shot, the final test scene may be used as the real scene, or the real scene may be shot using the now-known desired parameter values, (e.g., with the real actors).

Figure 3:
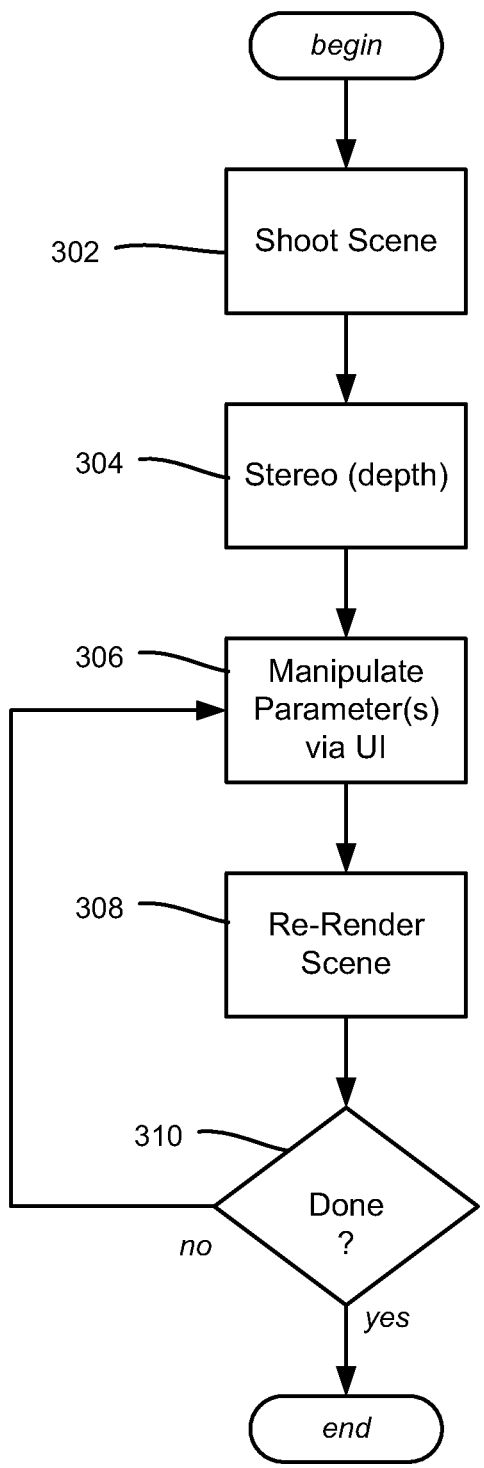
FIG. 3 is a flow diagram representing example steps to edit a stereoscopic cinema scene including interacting with parameters via the user interface.

FIG. 3 shows steps of an editing operation. Steps 302, 304 and 306 are similar to steps 202, 204 and 206 of FIG. 2 and are not again described, except to note that an actual scene instead of a test scene is being edited, and that the initial parameters are not needed as described below.

Step 308 allows the editor to re-render the scene with new parameter values whenever desired, whether after a single parameter value change or after several parameter value changes. Step 310 repeats the manipulation/re-rendering until the editor has obtained the desired results.

In order to facilitate the parameter manipulations described below, the user interface implements a mathematical framework, which abstracts away the mechanics of converting user interaction into stereo parameter values. More particularly, the framework abstracts the camera projector-screen-viewer geometry as ratios, allowing straightforward manipulation by a user.

The framework assumes that certain parameters associated with the viewer's experience are known or configured by the user, including the screen width $S_w$, the distance from the viewer to the screen $S_z$, and the distance between the viewer's eyes $B_e$. In one implementation, the parameters share the same units, and the origin of the world coordinate space is centered between the viewer's eyes. Thus, the positions of the left and right eyes are $\{-B_e/2, 0, 0\}$ and $\{B_e/2, 0, 0\}$ Representing the left and right image widths by W, the ratio $S_r = S_w/W$ is used to map pixel locations to physical screen locations.

Let a corresponding pair of points across the left and right images be $p_L = (c_L, r_L)$ and $p_R = (c_R, r_R)$, respectively. Since both images are rectified, $r_L = r_R$. After projecting both images onto the screen, the corresponding screen locations are $p_{Ls} = (c_{Ls}, r_{Ls})$ and $p_{Rs} = (c_{Rs}, r_{RLs})$. Note that $p_{Ls}$ and $p_{Rs}$ are specified in pixels.

When placing the images on the screen, two approaches may be taken, namely a vergent configuration or parallel configuration. Small screens typically use a vergent configuration in which the image centers are placed at the center of the screen. Larger screens commonly use a parallel configuration in which the image centers are offset by the assumed eye interocular. The equations below are the same for both, except where noted. The image disparity is given by $d = (c_R - c_L)$. The screen disparity $d_S = (c_{Rs} - c_{Ls})$ is either equal to d for the vergent configuration or equal to $d_S = d + B_e/S_r$ for the parallel configuration. In both cases, the perceived depth $Z_e$ is:

$$Z_e = \frac{B_e S_z}{B_e - d_S S_r}. \quad (1)$$

The perceived X coordinate from the viewer's perspective, $X_e$, is computed as:

$$X_e = \frac{Z_e}{S_z}\left[S_r\left(c_{L_S} - \frac{W}{2}\right) + \frac{B_e}{2}\right] - \frac{B_e}{2}. \quad (2)$$

The perceived Y coordinate is computed in a similar manner. Note that hereinafter for brevity, the formulae for the Y coordinate are not presented, as it is analogous to the X coordinate.

The above math can be extended for vertical (forward-backward) motion of the viewer, since that implies a new value for $S_z$. Horizontal (sideways) viewer motion does not change the perceived depth $Z_e$ since the motion is parallel to the screen. It does, however, result in a skew-like distortion of the scene shape due to a change in the x coordinate $X_e$. If $K_x$ is the horizontal shift of the viewer, the corrective term $$\frac{-K_x(Z_e - S_z)}{S_z}$$

is added to $X_e$ in Equation (2).

The user interface allows the user to change the viewer's perception of the scene by varying the parameter values, including camera field-of-view $\theta_c$, camera interocular $B_c$, camera vergence $V_c$, and dolly $Z_S$. The scene is far enough away from the cameras that changing the vergence is assumed to be equivalent to globally shifting the images along the X direction, which changes the image disparities. This approximation is exact only if the cameras are in a parallel configuration. For simplicity, vergence $V_c$ may thus be described as a horizontal pixel shift, e.g., given $V_c$, for example, the left image may be shifted to the left by $V_c/2$ pixels and the right image to the right by $V_c/2$ pixels.

Changes in the field-of-view and vergence values correspond to resizing and shifting of the images, respectively. However, manipulating the interocular and dollying the camera require the scene to be re-rendered. This is because changing the interocular and dollying result in camera translation, which has to account for scene parallax.

To compute new pixel positions based on the user-specified/edited parameter values, namely field-of-view angle $\theta_c$, camera vergence $V_c$, and dolly $Z_S$, the changes to these values may be applied in the order corresponding to a cameraman performing the same changes at video capture time, that is, dolly $Z_S$, interocular $B_c$, field-of-view $\theta_c$, and then vergence $V_c$.

While $V_c$ is manipulated as is, the other three parameters are manipulated as ratios of the original camera parameters $\theta_{c0}$, $B_{c0}$ and $Z_{S0}$:

$$\tan\left(\frac{\theta_c}{2}\right) = \alpha_\theta \tan\left(\frac{\theta_{c0}}{2}\right), B_c = \alpha_B B_{c0}, \text{ and } Z_s = \alpha_Z Z_{s0}. \quad (3)$$

By definition $V_{c0}=0$. From Equation (3), $\alpha_\theta$ scales the image about its center, $\alpha_B$ is the relative change in camera baseline, and $\alpha_Z$ is the "normalized" dolly using the unit distance $Z_{s0}$. $Z_{s0}$ is computed as a function of the viewer to screen depth as re-projected in camera space:

$$Z_{s0} = \frac{B_{c0} S_w}{2 B_e \tan\left(\frac{\theta_{c0}}{2}\right)}. \quad (4)$$

Providing these quantities as ratios is useful in scenarios in which camera parameters are hard to quantify or are unknown. Indeed, if only post-production effects are desired, the camera parameters are not needed. However, to plan a shot the original camera parameters need to be known. By directly manipulating the stereoscopic effect, the user is indirectly changing the camera parameter values that caused it. For example, the framework scales the scene in a manner inversely proportional to the camera interocular ratio $\alpha_B$. This addresses gigantism and miniaturization effects by changing the scene shape, which is equivalent to changing the camera baseline.

The framework uses Equations (1) and (2) to compute the original $X_e$ and $Z_e$ coordinates before any manipulations using the original screen column location $c_{Ls}$ and screen disparity $d_S$ for pixel $p_{Ls}$. Applying the changes in camera interocular and dolly provides a new set of 3D perceived coordinates $\overline{X}_e$ and $\overline{Z}_e$:

$$\overline{Z}_e = \frac{Z_e + S_z \alpha_Z - S_z}{\alpha_B}, \overline{X}_e = \frac{X_e}{\alpha_B}. \quad (5)$$

Next, the transformed point is projected onto the movie screen to find a new set of screen coordinates ($\overline{c}_{Ls}$, $\overline{r}_{Ls}$) and screen disparity $\overline{d}_S$:

$$\overline{c}_{L_S} = \frac{S_r(2\overline{X}_e S_z - B_e \overline{Z}_e + B_e S_z)}{2\overline{Z}_e} + \frac{W}{2}. \quad (6)$$

The value of $\overline{c}_{Rs}$ may be similarly computed, after which the framework can compute the new disparity $\overline{d}_S = \overline{c}_{Rs} - \overline{c}_{Ls}$. The field-of-view and vergence changes are then applied to find the new screen coordinates ($c'_{Ls}$, $r'_{Ls}$) and warped screen disparity $d'_S$:

$$c'_{L_S} = \alpha_S\left(\overline{c}_{L_S} - \frac{W}{2}\right) + \frac{W}{2} - \frac{V_c}{2}, \quad (7)$$
$$d'_S = \alpha_\theta \overline{d}_S + V_c, \text{ and } c'_{R_S} = c'_{L_S} + d'_S.$$

Equation (7) assumes a vergent configuration. If a parallel configuration is used, the images are additionally shifted in the X direction (by $B_e/(2S_r)$) before and after scaling.

Figure 4:
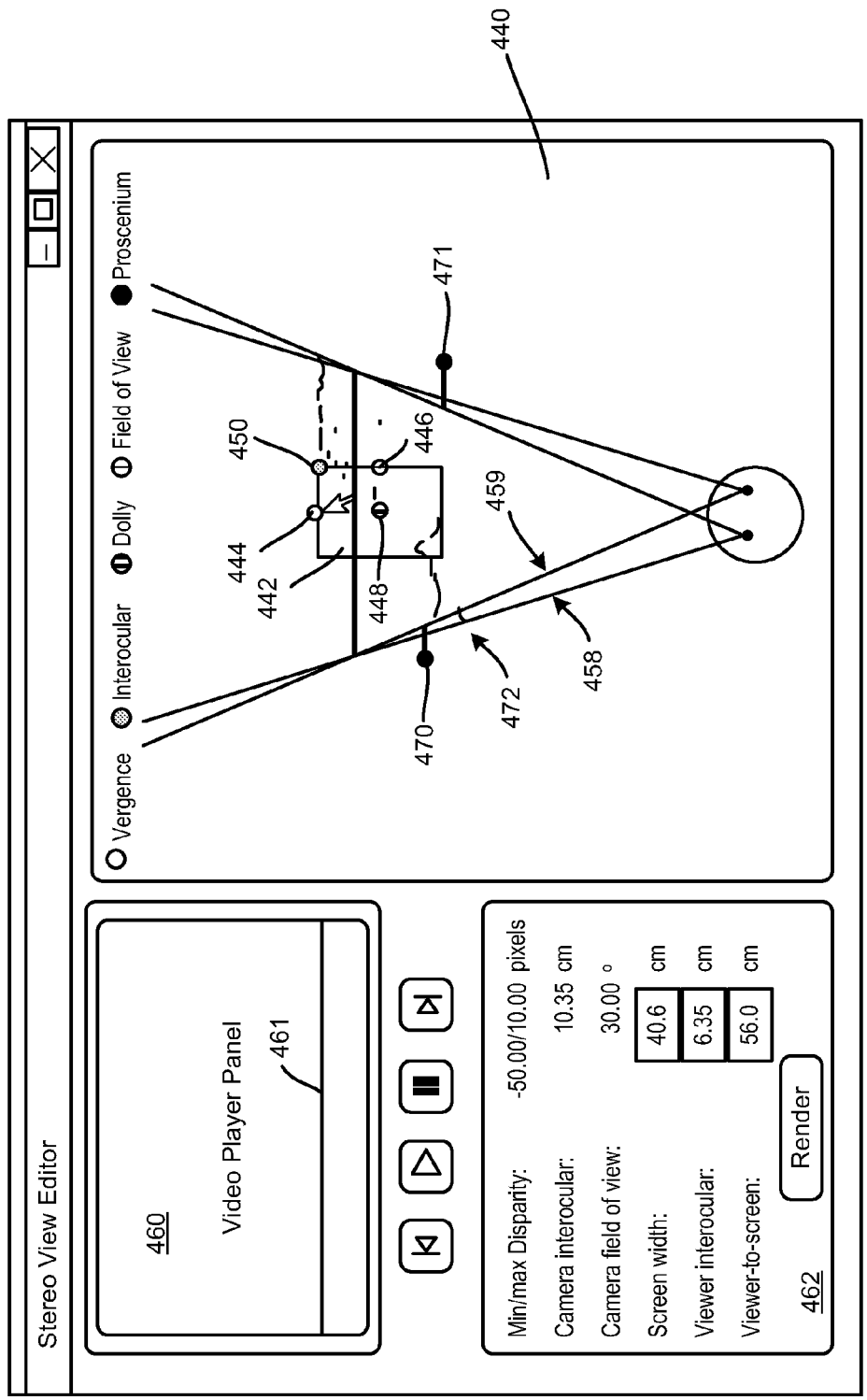
FIG. 4 is a representation of one implementation of a user interface, including a view-from-above (above-view) perspective showing how a scene is perceived from a viewer centric viewpoint.

Turning to the user interface aspects, as represented in FIG. 4 the user can directly manipulate the shape of the world as perceived by a viewer. This is enabled by a top-down, "above view" of the perceived scene's point cloud associated with scanline 461, as shown in FIG. 4 in the region (panel) labeled 440. Note that the small the irregular lines and curves in this panel correspond to the fronts of objects that are in the scene. A known algorithm is used to automatically generate the image disparities and render a new set of stereo images given the edited parameters.

In one implementation, a box widget, (or simply box 442) is provided as part of the interface to allow the user to easily manipulate the perceived shape of the world. More particularly, the box 442 (or other suitable two-dimensional figure) is overlaid on the perceived scene points. The user manipulates various parts of the box 442 to effect specific changes. To this end, dots/handles are provided corresponding to the parameters (a legend is available to assist the user as to which dot controls which parameter; in an actual implementation, the dots have different colors to help the user recognize which parameter is being manipulated).

With respect to dot manipulation a mouse pointer is shown manipulating a dot/handle 444 to change the vergence parameter value. The user can change the perceived scene shape (and subsequently re-render new stereo images) by manipulating the box in the various ways via the dots/handles. Note that in general, rendering is deferred until a later time.

Figure 6:
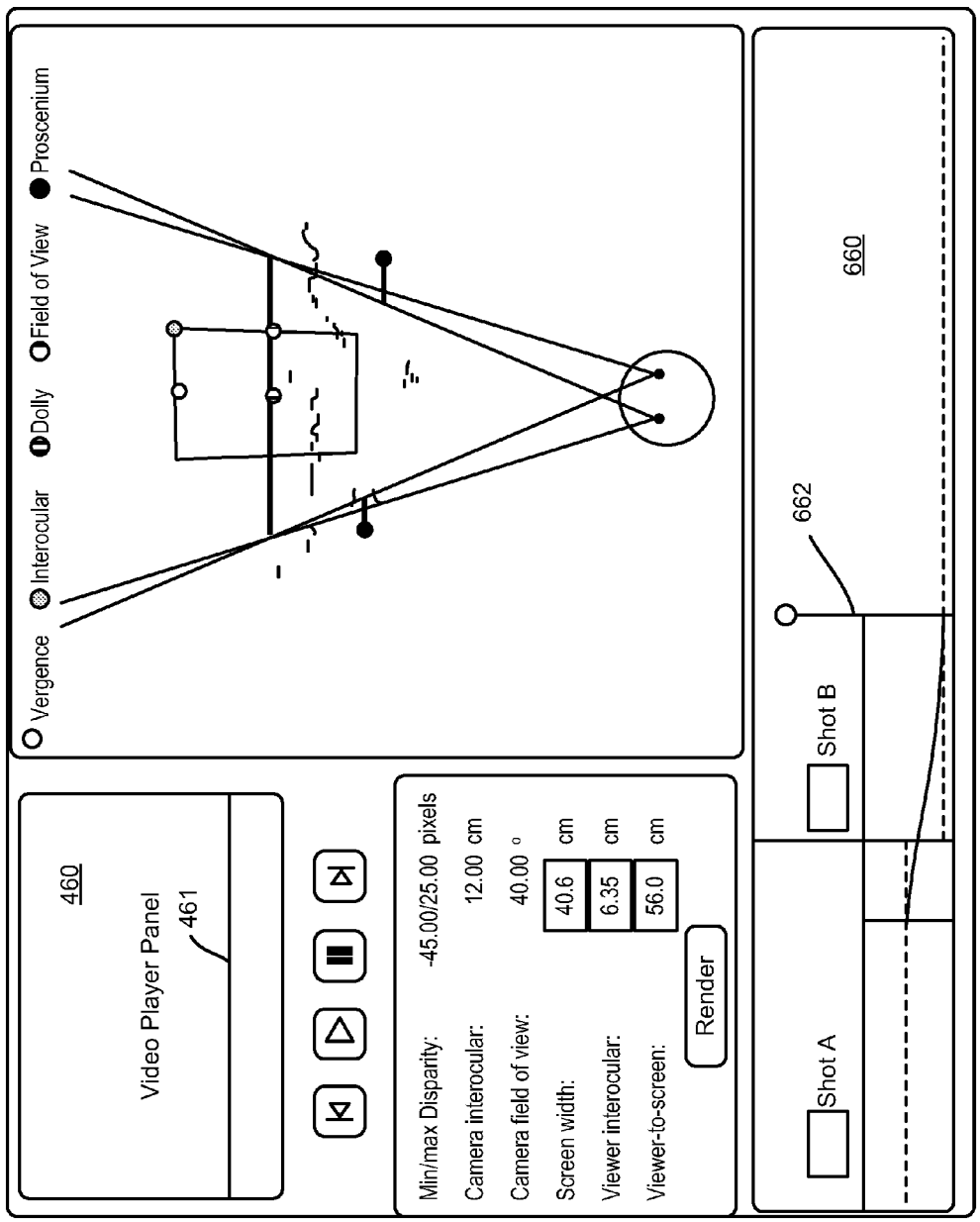
FIG. 6 is a representation of one implementation of a user interface, including a panel for controlling how objects are perceived when transitioning between shots.

The shape of the box is meaningful because it summarizes the stereo effects present in the rendered images. For example, when this box is exactly square, it signifies that there is zero distortion for the viewer. As another example, cardboarding or pinching correspond to a flattening or elongation, respectively, of this box. Note that FIG. 6 shows a non-rectangular box.

One such way to manipulate the box (change parameter values) is to add/enhance cardboarding and pinching effects by changing the field of view parameter. The user can change the field of view by movement of (e.g., dragging) the dot/handle 446 on the side of the box; this changes the original camera focal length as well. The distortion of the box mirrors the pinching effects that occur with wider fields-of-view, for example.

Dragging the vergence dot/handle 444 translates images left and right. As described above, parts of the scene with zero disparity appear to be located at the depth of the screen. Changing the vergence has the effect of changing the parts of the scene that appear to be located at the screen. The user changes the vergence by moving the dot 444 at the top of the box 442 up or down. This results in the left and right stereo frames being shifted in the X direction. Note that this action non-uniformly distorts the 3D scene shape.

The dolly dot/handle 448 translates the scene forward or backward. The user dollies (i.e., changes the perceived camera-scene distance) by dragging the dot 448 that is in the center of the square. As the scene gets closer to the viewer, the virtual cameras move closer to the scene. Dolly causes no distortions, since it accounts for parallax effects (which are depth dependent). The extent to which the user can dolly depends on the quality of the stereo data. Although small shifts are possible, they may result in a large change in stereo experience.

By dragging the dot/handle 450 on the corner of the box, the user changes the interocular parameter value, which scales the scene to appear larger or smaller. This effect changes the camera baseline, and provides the known effects of miniaturization and gigantism.

The user interface exemplified in FIG. 4 also includes two other regions, or panels. One panel is a video player panel 460 that plays the scene as it is currently parameterized; the point cloud (top view in 440) is the depth distribution associated with the pixels along line 461. The other panel 462 shows current values corresponding to some or all of the parameters. In one implementation, the user may directly enter at least some of these values, such as to provide very precise values that, for example, a user cannot quite achieve by dragging the dots/handles.

Figure 5:
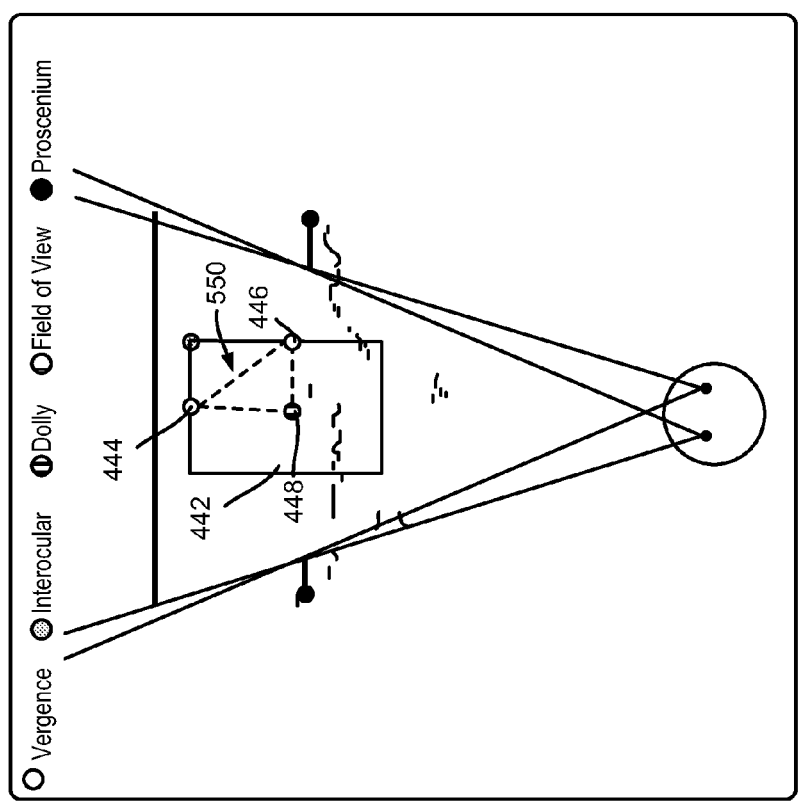
FIG. 5 is a representation illustrating how parameters that are coupled together may be visually indicated as such on a user interface.

In addition to individually adjusting parameters, one or more parameters may be coupled such that changing one parameter's value changes the other or others. A checkbox or the like may be provided to allow the user to "lock" different camera parameters together to create new stereoscopic effects. One example for using coupling is the stereoscopic equivalent of the well-known "Hitchcock zoom" effect (named after the renowned movie director) in which a foreground subject stays the same size by adjusting the camera focal length while the dolly moves the camera closer or further from the subject thereby changing the size of background objects. This effect is accomplished in the user interface by coupling together the dolly, field-of-view and vergence parameters. Note that if a parallel configuration is used, only dolly and field-of-view need to be coupled for this effect. Note that this may be visually indicated to the user as represented in FIG. 5 via the dashed lines that show which parameters via their handles are coupled together, e.g., the three handles 444, 446 and 448 are coupled together by line segments, forming a triangle 550 in this example; (if only two are coupled, a single segment is shown). Further note that while dashed lines are shown, colored/solid lines are used in one implementation.

In general, the point of the Hitchcock effect is to keep some subject steady while the background moves behind the subject. This effect has been extended in an implementation to keep the depth of the subject constant, while the depth of the background changes. Thus, the manipulation has a subject depth. Because depths are depicted with the point cloud in the user interface, one way in which the user may invoke the Hitchcock effect is to click on a particular depth in the point cloud (the subject depth), and drag up or down. That subject depth is kept constant, while the depth of the rest of the scene is varied.

Turning to another aspect, the user interface may be used for shifting proscenium arch. More particularly, in many stereoscopic shots with objects appearing in front of the screen, there tend to be regions on the edges of the screen that can be seen by only one eye. For example, taking the viewing points corresponding to a viewers eyes in FIG. 4, anything between the two angled lines labeled 458 and 459, such as the object labeled 472, can be seen by the left eye but not the right eye of a viewer.

Such areas appear inconsistent with the scene edges, and will likely cause eye strain in some viewers. The proscenium arch parameter is used to obscure (black out) part of the stereo frame to basically move the perceived edge of the screen closer to the viewer. Its length is adjusted by moving the black dots (depth markers) 470 and 471 along the line of sight. When the proscenium arch is appropriately positioned, it becomes easier for viewers' eyes/brains to fuse objects near the image edge.

Turning to the creation of post-production effects, a movie editor needs to cut between shots, such as to tell a story in a certain way by switching between contrasting scenes. Recent trends include using very fast, multiple cuts; for stereoscopic content, however, such fast cuts create a significant potential for visual discomfort to users, because there is a lag time in the ability of viewers to fuse scenes at differing depths.

One way to mitigate visual discomfort is to blend the vergence before and after a cut so the objects of interest have the same depth at the cut. For example, consider an object of attention in a scene that appears to be behind the screen. If suddenly the scene is cut to one in which an object of attention is now in front of the screen, a jarring "jump" is sensed by the viewer. However, a subtle shifting of the vergence before and after the cut can prevent the jump in depth and result in a more visually pleasing transition; this subtle vergence change can generally be done without being noticed by the viewer.

FIG. 6 shows an interface panel 660 that an editor may use to control the shifting of vergence between two shots, Shot A and Shot B. The dashed lines represent how the depth of the object of attention in Shot A would transition to the depth of the object of attention in Shot B without vergence shifting, namely as an "instantaneous" jump that is perceived as fast as the user can process it. Using the user interface, the editor/planner can obtain a depth from an object in the previous clip and another in the next clip; the shifting may be according to any of various blending functions (e.g., linear, cubic spline and so forth). A mechanism such as a slide-able bar 662 or other timing control mechanism can be used to control the timing as to when the transition starts and ends. The editor/planner can thus choose to have the vergence blended before and after the cut, so that at the cut the two objects have the same disparities. This results in a more visually pleasing transition.

Vergence may also be used to direct attention to an object. Note that vergence changes are usually not noticed by viewers, and that full image fusion occurs in viewers after a short time lag (which may vary from person to person). If the scene cuts back and forth faster than this time lag, then objects with similar disparities to the area currently fused are fused first. Therefore, a viewer's attention may be directed by alternatively adjusting the areas of similar disparity using vergence changes.

Exemplary Operating Environment

Figure 7:
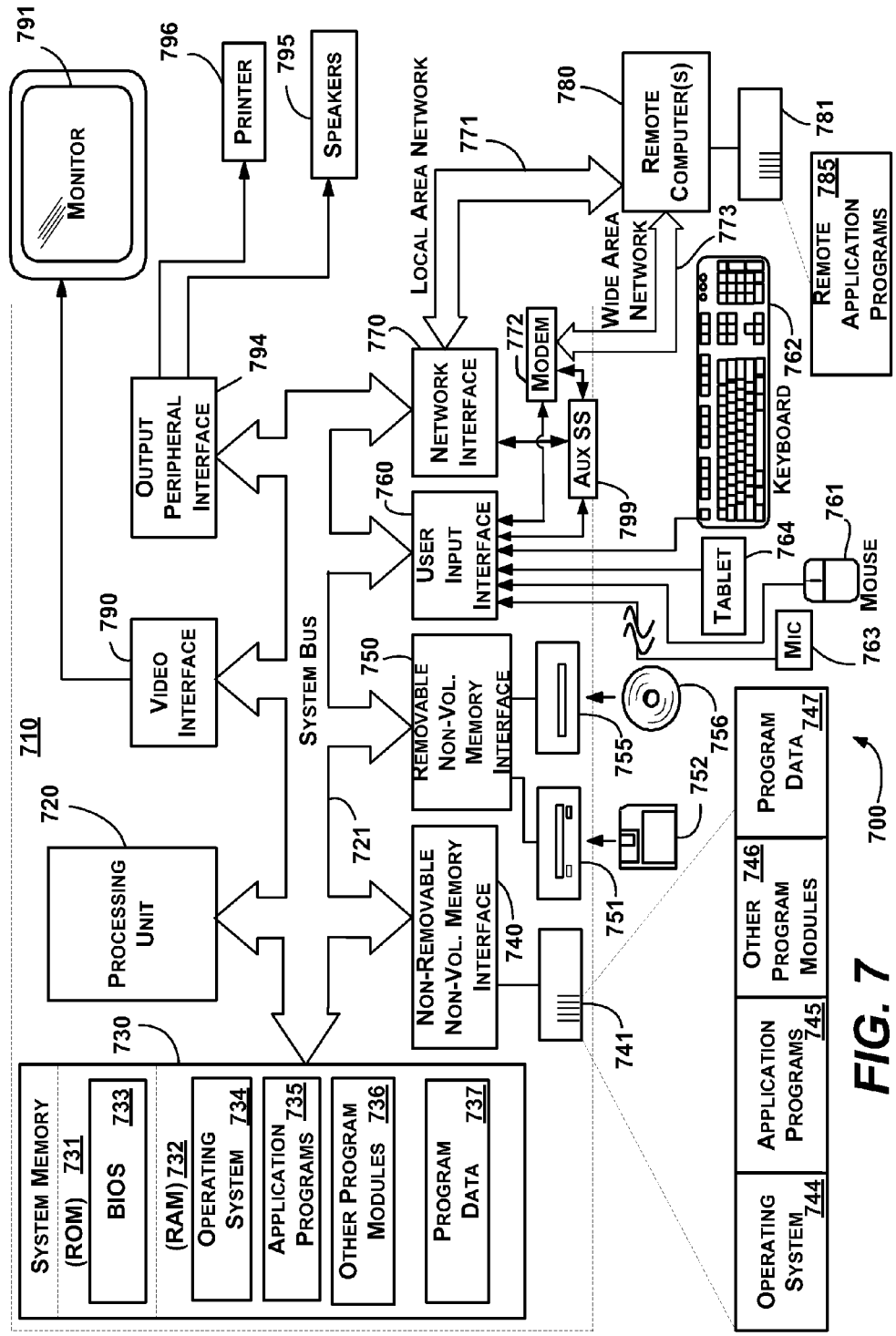
FIG. 7 shows an illustrative example of a computing environment into which various aspects of the present invention may be incorporated.

FIG. 7 illustrates an example of a suitable computing and networking environment 700 into which the examples and implementations of any of FIGS. 1-6 may be implemented. The computing system environment 700 is only one example of a suitable computing environment and is not intended to suggest any limitation as to the scope of use or functionality of the invention. Neither should the computing environment 700 be interpreted as having any dependency or requirement relating to any one or combination of components illustrated in the exemplary operating environment 700.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 7, an exemplary system for implementing various aspects of the invention may include a general purpose computing device in the form of a computer 710. Components of the computer 710 may include, but are not limited to, a processing unit 720, a system memory 730, and a system bus 721 that couples various system components including the system memory to the processing unit 720. The system bus 721 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 710 typically includes a variety of computer-readable media. Computer-readable media can be any available media that can be accessed by the computer 710 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 710. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The system memory 730 includes computer storage media in the form of volatile and/or nonvolatile memory such as read only memory (ROM) 731 and random access memory (RAM) 732. A basic input/output system 733 (BIOS), containing the basic routines that help to transfer information between elements within computer 710, such as during start-up, is typically stored in ROM 731. RAM 732 typically contains data and/or program modules that are immediately accessible to and/or presently being operated on by processing unit 720. By way of example, and not limitation, FIG. 7 illustrates operating system 734, application programs 735, other program modules 736 and program data 737.

The computer 710 may also include other removable/non-removable, volatile/nonvolatile computer storage media. By way of example only, FIG. 7 illustrates a hard disk drive 741 that reads from or writes to non-removable, nonvolatile magnetic media, a magnetic disk drive 751 that reads from or writes to a removable, nonvolatile magnetic disk 752, and an optical disk drive 755 that reads from or writes to a removable, nonvolatile optical disk 756 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 741 is typically connected to the system bus 721 through a non-removable memory interface such as interface 740, and magnetic disk drive 751 and optical disk drive 755 are typically connected to the system bus 721 by a removable memory interface, such as interface 750.

The drives and their associated computer storage media, described above and illustrated in FIG. 7, provide storage of computer-readable instructions, data structures, program modules and other data for the computer 710. In FIG. 7, for example, hard disk drive 741 is illustrated as storing operating system 744, application programs 745, other program modules 746 and program data 747. Note that these components can either be the same as or different from operating system 734, application programs 735, other program modules 736, and program data 737. Operating system 744, application programs 745, other program modules 746, and program data 747 are given different numbers herein to illustrate that, at a minimum, they are different copies. A user may enter commands and information into the computer 710 through input devices such as a tablet, or electronic digitizer, 764, a microphone 763, a keyboard 762 and pointing device 761, commonly referred to as mouse, trackball or touch pad. Other input devices not shown in FIG. 7 may include a joystick, game pad, satellite dish, scanner, or the like. These and other input devices are often connected to the processing unit 720 through a user input interface 760 that is coupled to the system bus, but may be connected by other interface and bus structures, such as a parallel port, game port or a universal serial bus (USB). A monitor 791 or other type of display device is also connected to the system bus 721 via an interface, such as a video interface 790. The monitor 791 may also be integrated with a touch-screen panel or the like. The monitor 791 may additionally be equipped to allow the display of stereo images through the use of polarized glasses or other mechanisms. Note that the monitor and/or touch screen panel can be physically coupled to a housing in which the computing device 710 is incorporated, such as in a tablet-type personal computer. In addition, computers such as the computing device 710 may also include other peripheral output devices such as speakers 795 and printer 796, which may be connected through an output peripheral interface 794 or the like.

The computer 710 may operate in a networked environment using logical connections to one or more remote computers, such as a remote computer 780. The remote computer 780 may be a personal computer, a server, a router, a network PC, a peer device or other common network node, and typically includes many or all of the elements described above relative to the computer 710, although only a memory storage device 781 has been illustrated in FIG. 7. The logical connections depicted in FIG. 7 include one or more local area networks (LAN) 771 and one or more wide area networks (WAN) 773, but may also include other networks. Such networking environments are commonplace in offices, enterprise-wide computer networks, intranets and the Internet.

When used in a LAN networking environment, the computer 710 is connected to the LAN 771 through a network interface or adapter 770. When used in a WAN networking environment, the computer 710 typically includes a modem 772 or other means for establishing communications over the WAN 773, such as the Internet. The modem 772, which may be internal or external, may be connected to the system bus 721 via the user input interface 760 or other appropriate mechanism. A wireless networking component 774 such as comprising an interface and antenna may be coupled through a suitable device such as an access point or peer computer to a WAN or LAN. In a networked environment, program modules depicted relative to the computer 710, or portions thereof, may be stored in the remote memory storage device. By way of example, and not limitation, FIG. 7 illustrates remote application programs 785 as residing on memory device 781. It may be appreciated that the network connections shown are exemplary and other means of establishing a communications link between the computers may be used.

An auxiliary subsystem 799 (e.g., for auxiliary display of content) may be connected via the user interface 760 to allow data such as program content, system status and event notifications to be provided to the user, even if the main portions of the computer system are in a low power state. The auxiliary subsystem 799 may be connected to the modem 772 and/or network interface 770 to allow communication between these systems while the main processing unit 720 is in a low power state.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents failing within the spirit and scope of the invention.

What is claimed is:

1. In a computing environment, a system comprising:
   one or more processors;
   a user interface, implemented on the one or more processors, configured to manipulate one or more parameter values associated with a stereo video scene, the user interface including an above view representation of at least part of a scene, the above view representation showing a viewer's viewpoint with respect to a screen location, the representation being interactive with respect to obtaining input for manipulating the one or more parameter values, the user interface further configured to provide a selection to lock together one or more different types of parameter values to create a stereoscopic effect, such that changing one parameter value changes the one or more different types of parameter values locked together with the one parameter value; and
   a timing control mechanism configured to control operations of blending vergence values before and after a cut or changing the vergence values to draw attention to an object in the scene.

2. The system of claim 1 wherein one of the parameter values corresponds to a vergence parameter.

3. The system of claim 1 wherein one of the parameter values corresponds to an interocular parameter.

4. The system of claim 1 wherein one of the parameter values corresponds to a dolly parameter.

5. The system of claim 1 wherein one of the parameter values corresponds to a field of view parameter.

6. The system of claim 1 wherein one of the parameter values corresponds to a proscenium parameter.

7. The system of claim 1 wherein at least two parameters are present and coupled together such that a change to one parameter value changes the parameter value of each other parameter coupled to the parameter corresponding to the value that changed.

8. The system of claim 7 wherein the dolly parameter and the field of view parameter are coupled, or wherein the vergence parameter, dolly parameter, and field of view parameter are coupled.

9. The system of claim 1 wherein the representation is interactive with respect to receiving input via a moveable handle, in which movement of that handle changes a corresponding parameter value.

10. The system of claim 9 wherein the representation includes a box, with the shape of the box changing as the moveable handle moves to change the corresponding parameter value.

11. The system of claim 1 wherein the user interface includes an interactive panel that shows a numerical value for at least one parameter.

12. The system of claim 1 wherein the user interface includes a video player panel for viewing the stereo scene.

13. The system of claim 1 wherein the viewer's viewpoint comprises two points representing eyes of a viewer, and wherein the representation includes information indicative of viewing angles from each point.

14. In a computing environment, a method comprising:
   providing a user interface that displays a representation of a stereo scene and includes interactive mechanisms for changing parameter values, including a mechanism for changing a vergence parameter value, a mechanism for changing a dolly parameter value, a mechanism for changing a field-of-view parameter value, a mechanism for changing a proscenium arch parameter value, and a mechanism for changing an interocular parameter value;
   receiving data corresponding to interaction with at least one of the interactive mechanisms;
   changing the parameter value that corresponds to the at least one of the interactive mechanisms; and
   transitioning a depth for an object in at least one scene by blending the vergence parameter value with another vergence parameter value before and after a cut of the at least one scene.

15. The method of claim 14 further comprising, outputting a new stereo video based on the parameter value changes, outputting new parameter values for reshooting a video scene, or changing at least some of the parameter values to adjust for changed theater parameter values.

16. The method of claim 14 further comprising: obscuring part of the stereo scene based upon the value of the proscenium arch parameter.

17. In a computing environment, a system comprising:
one or more processors;
a user interface, implemented on the one or more processors, configured for interaction to change parameter values corresponding to parameters of a stereo scene, including a vergence parameter, a dolly parameter, a field-of-view parameter, a proscenium arch parameter, and an interocular parameter, the user interface providing an above view of a scene including a representation of a single viewer's eyes, a representation of a viewing screen, and an indication simulating what each of the single viewer's eyes perceive on the viewing screen, wherein the user interface is configured to repeatedly manipulate at least one scene with at least one of another vergence parameter value, another dolly parameter value, another field-of-view parameter value, another proscenium arch parameter, or another interocular parameter value, and to perform at least one of blending vergence values before and after a cut or changing the vergence values to draw attention to an object in the scene.

18. The system of claim 17 wherein the proscenium arch parameter includes a value that is changeable by adjusting depth markers along a line of sight corresponding to the single viewer's eyes.

19. The system of claim 17 wherein the user interface is configured for interaction via handles displayed within the above view of the scene, each handle associated with a parameter and being moveable relative to the scene, and wherein movement of a handle changes its position relative to the scene and correspondingly changes the parameter value of that handle's associated parameter.

20. The system of claim 17 wherein the user interface is further configured to obscure part of the stereo scene based upon the value of the proscenium arch parameter.

* * * * *